United States Patent [19]

Bevilacqua et al.

[11] 4,134,790
[45] Jan. 16, 1979

[54] FUEL LOCK DOWN DEVICE

[75] Inventors: Frank Bevilacqua, Windsor; Malcolm D. Groves, Suffield, both of Conn.

[73] Assignee: Combustion Engineering, Inc., Windsor, Conn.

[21] Appl. No.: 784,085

[22] Filed: Apr. 4, 1977

[51] Int. Cl.² ............................................. G21C 3/12
[52] U.S. Cl. ........................................ 176/50; 176/78; 176/87
[58] Field of Search ................... 176/50, 61, 87, 78, 176/77

[56] References Cited

U.S. PATENT DOCUMENTS

| 3,057,793 | 10/1962 | Coates et al. | 176/50 |
| 3,166,481 | 1/1965 | Braun | 176/50 |
| 3,389,056 | 6/1968 | Frisch | 176/78 |
| 3,769,158 | 10/1973 | Winders | 176/78 |
| 3,853,703 | 12/1974 | Anthony et al. | 176/50 |

FOREIGN PATENT DOCUMENTS

| 1281809 | 12/1961 | France | 176/77 |
| 930661 | 7/1963 | United Kingdom | 176/77 |
| 1204125 | 9/1970 | United Kingdom | 176/78 |

Primary Examiner—Harvey E. Behrend
Attorney, Agent, or Firm—Lombro J. Ristas

[57] ABSTRACT

A lock down device for restraining a nuclear fuel assembly against hydraulic flow forces having cantilever leaf springs on the fuel assembly lower end fitting which lock into recesses in the fuel alignment pins located on the core support plate.

9 Claims, 6 Drawing Figures

FUEL LOCK DOWN DEVICE

BACKGROUND OF THE INVENTION

The present invention relates to nuclear fuel assemblies and more particularly to lock down devices for nuclear fuel assemblies.

It is well known that nuclear power reactors typically contain a plurality of nuclear fuel assemblies arranged and supported between an upper core alignment plate and a lower core support plate. The upper and lower ends of the fuel assemblies are typically provided with end fittings which include alignment posts that extend outwardly from the end of the fuel assemblies and slidably engage post receiving openings in the plates. The weight of the fuel assemblies is typically borne by the core support plate.

During operation of the reactor a fluid coolant such as water is forced vertically upward through the fuel assemblies to remove the heat generated therein. This upward flow produces a lifting force on the fuel assemblies which can exceed the weight of the fuel assembly itself. Consequently, various prior art devices have been used at the top or the bottom of the fuel assembly to prevent the assembly from lifting off the core support plate. If this upward motion of the fuel assembly is not prevented, damage to its fuel rods and to the upper alignment plate may result. In addition, lateral motion of the fuel assemblies can adversely affect the local power density in the core and can cause wear between the fuel rods and the grid structure of the fuel assembly.

The devices which hold the fuel assemblies in place must also accommodate differential thermal expansion of each assembly and the various other core components. Thus the fuel assemblies are usually supported between the upper alignment plate and the core support plate in a manner which permits relative axial growth without overly stressing the components of the fuel assembly.

Although, as described above, the fuel assembly must be held firmly in place during core operation, the periodic refueling of the reactor requires that the assembly be easily relocatable within the core when the reactor vessel head is unbolted and removed.

One method of holding down fuel assemblies disclosed in the prior art uses a bayonet lock at the bottom of the center fuel element of a seven element hexogonal assembly. The lock is actuated by rotating the center fuel element. This device is impractical in modern reactors where closely packed square fuel assemblies do not provide clearance for rotation. Other bottom mounted locking devices permit simultaneous locking or unlocking of an entire row of fuel assemblies through the motion of an actuating rod that extends horizontally and in contact with a bottom extension of each fuel assembly. Each actuating rod is driven by means external to the reactor vessel thus requiring many penetrations in the lower portion of the reactor vessel. These penetrations are undesirable for reactors operating at the high pressures common in modern reactors, and external driving means require space around the reactor vessel which is not provided in current reactor cavity designs.

In recent years the major nuclear power reactor suppliers in the United States have held assemblies in place with the use of various spring arrangements between the top of the fuel assembly and the upper core alignment plate. These designs typically require a substantial compressive pre-loading of the springs so that enough hold-down force is applied to the assemblies to resist the upward forces that exist during core operation. This pre-load force is transmitted from the top of the fuel assembly to the bottom of the assembly through the control element guide tubes. The guide tubes provide a path for insertion of the control rods, and the guide tubes and the fuel assembly spacer grids attached thereto provide the framework which maintains the proper spacing and alignment of the individual fuel rods in an assembly.

In the past the control rod guide tubes were typically made from stainless steel, a material having the desirable characteristic of high compressive strength, but the undesirable characteristic of a high cross section for parisitic neutron absorption. In order to improve the neutron economy in the reactors, the guide tubes have more recently been fabricated from zircaloy. This material is less resistant to compressive stresses than is stainless steel. Consequently, there is a greater likelihood that the pre-loading of the fuel assemblies as described above can result in bowing of the guide tubes and as a result bowing of the entire fuel assembly. This problem has become more acute in recent years as the power densities and flow rates in the reactors have increased, thereby requiring larger hold-down springs and pre-loading forces. These top mounted springs have several other disadvantages. Their size not only contributes to the flow resistance offered by the fuel assembly, but also increases the required height of the reactor vessel by several inches and the cost of the vessel by several thousand dollars. In addition, since the pre-load force typically originates from the weight of the reactor vessel head and upper guide structure bearing down on the upper core alignment plate, if the total pre-load which the upper springs must provide is greater than the combined weight of the reactor vessel head and upper guide structure, special techniques are required for bolting down the reactor vessel head.

A prior art improvement to the top mounted spring hold-down device moves the springs to the bottom of the fuel assembly where an upward compressive force is applied to the bottom of the control rod guide tubes. The compressive pre-load force on the guide tubes in this design is approximately equal to the weight of the fuel assembly in water, or about 1200 pounds. This is a significant reduction in compressive force relative to the upper spring design but the possibility of guide tube and fuel assembly bowing is still significant. The consequences of fuel assembly bowing can be quite severe. For example, the local power density surrounding individual fuel pins can be much higher than predicted under unbowed conditions. Also a bowed fuel assembly may not be relocatable because the distortions and non-rectangularity may prevent a proper fit in relation to adjacent assemblies. A further possibility is that the guide tube will be bowed enough to interfere with the dropping of a control rod therethrough.

Another disadvantage of both the top mounted spring hold-down and the bottom mounted spring hold up devices disclosed in the prior art is the possibility of small but continual lateral motion of the end fittings and guide tubes during core operation. Since the fuel assembly spacer grids are attached to the guide tubes, these grids also will move laterally. The lateral motion of the grids can cause wear on the surface of the fuel rods which, after a year or two of operation, may significantly increase the susceptibility of the fuel rods to clad failure.

Thus it can be seen that early fuel assembly hold-down devices included positive locking means at the bottom of the fuel assembly. However, as reactors became larger and more complex, space limitations and ease of refueling, in combination with the ability to accommodate different expansion rates of the various core components, led to the wide spread use of upper mounted spring hold-down devices and, more recently, lower mounted spring hold up devices. Although these latter devices adequately perform their intended hold-down function, they increase the possibility of problems resulting from compression of the control rod guide tubes and the small but continual lateral motion of the guide tubes.

SUMMARY OF THE INVENTION

It is an object of the present invention to provide an inexpensive apparatus for automatically securing a fuel assembly to the core support plate without compressively stressing the control rod guide tubes.

Another object of the invention is to reduce the possibility of lateral motion in a fuel assembly secured to the core support plate.

It is a further object of the invention to simplify the effort required to load and unload fuel assemblies into the reactor.

The present invention employs spring-actuated latches between the fuel assembly lower alignment posts and the fuel assembly alignment pins on the core support plate to automatically lock the fuel assembly in place. Angles on the spring surfaces are selected so that the weight of the fuel assembly causes self-actuation of the device during insertion. The horizontal components of the spring load are used to restrain lateral motion of the fuel assembly. Removal of the fuel assembly is accomplished by applying an axial force with the refueling machine sufficient to overpower the spring load.

Several advantages of the invention are immediately evident. The elements are inexpensive to manufacture and fabricate, yet provide simple, reliable operation. No vessel penetrations are needed and the locking and unlocking of the assembly can be accomplished with the typical refueling machine normally used for loading and unloading the assembly. The small size and vertical orientation of the elements require less space than most prior art devices and offer less flow restriction. In addition, material costs can be further reduced since the reactor vessel can be shortened by several inches relative to designs employing fuel assembly hold-down springs. Furthermore, the weight of the fuel assembly itself actuates the locking mechanism making unnecessary the use of the torque pressure of the vessel head applied to the upper core alignment plate for pre-loading the springs. Thus the special care and techniques used to tighten or remove the fuel alignment plate and reactor vessel head in designs requiring such pre-loading will never be needed with the present invention. Finally, no vertical compressive force is exerted on the guide tubes, and lateral vibration of the assembly is prevented.

DESCRIPTION OF THE PREFERRED EMBODIMENTS

Figure 1:
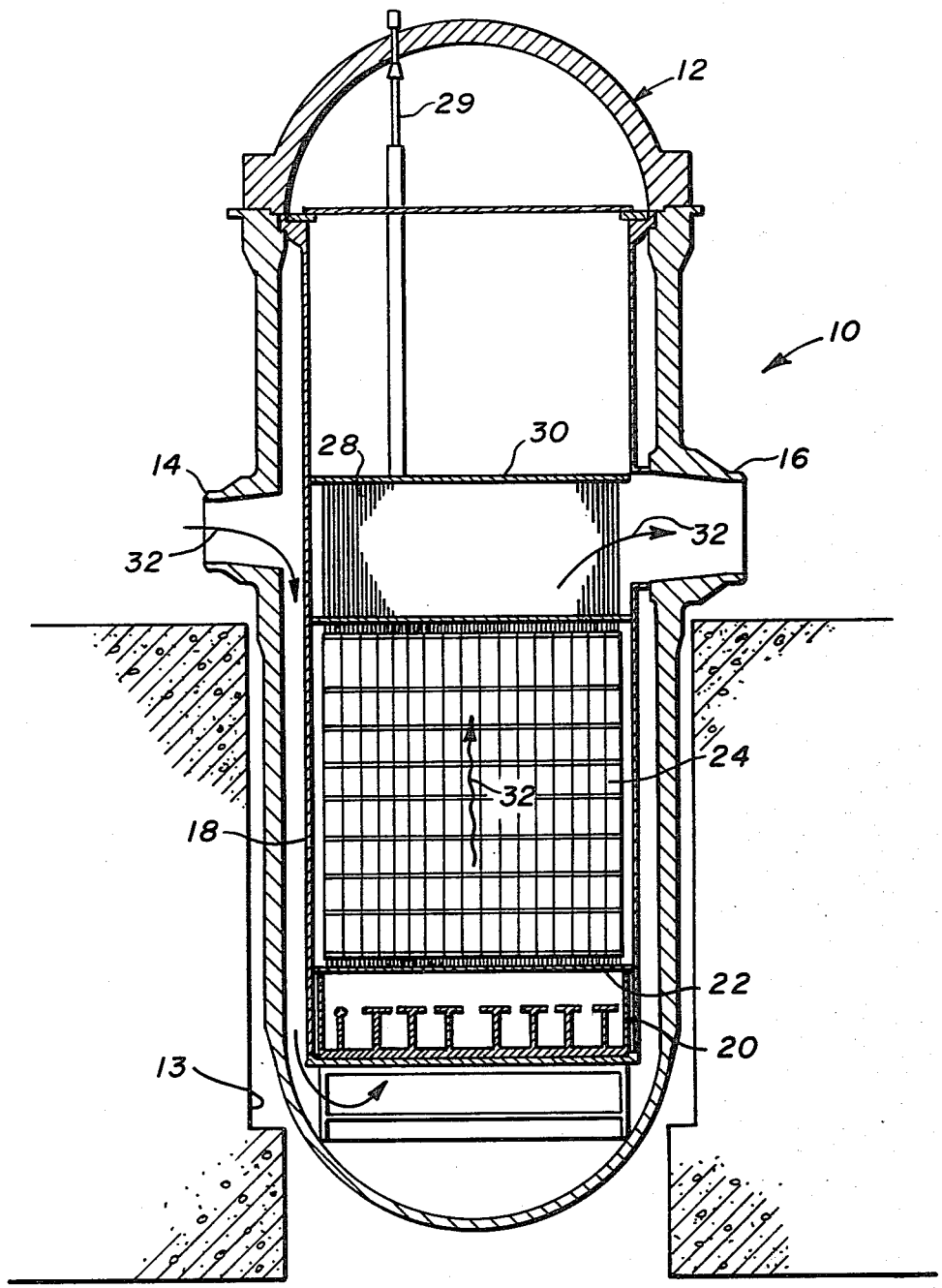
FIG. 1 is a vertical section through a nuclear reactor of the type embodying the present invention.

Referring first to FIG. 1, there is illustrated a typical nuclear reactor vessel 10 and reactor vessel closure head 12. The reactor vessel is typically vertically disposed in a concrete reactor cavity 13 and connected to other components of the nuclear steam supply system (not shown) by means of a reactor coolant inlet nozzle 14 and outlet nozzle 16. Most of the components internal to the reactor vessel 10 are supported directly or indirectly by the core support barrel 18 which is suspended from and firmly engaged between the closure surface between the vessel head 12 and the top of the reactor vessel 10. The core support assembly 20 rests on the bottom of the core support barrel 18 and the core support plate 22 rests on top of the core support assembly 20. The core support plate 22 serves to support and align a plurality of fuel assemblies 24 which are also aligned at the top by the upper core alignment plate 26. Alignment of the assemblies 24 at the top and bottom is typically effected by means of fuel assembly end fittings (not shown) which are adapted to mate with end fitting receiving means (not shown) on the core support plate 22 and the upper core alignment plate 26.

During normal reactor operation, a liquid coolant enters the vessel through inlet nozzle 14 and follows the flow path 32 down the outside of the core support barrel 18 and up through the core support assembly 20 which structures are adequately orificed for such flow. The coolant continues upward through the fuel assemblies 24 where mixing grids (not shown) and thousands of individual fuel rods (not shown) produce large flow resistances tending to push the fuel assemblies 24 towards the upper core alignment plate 26. The alignment plate 26 is typically restrained from moving upwards by the downward force of the upper guide structure support plate 30 transmitted through a plurality of control rod shroud tubes 28 welded to the upper guide structure support plate 30 and the upper core alignment plate 26. The upper guide structure support plate 30 is suspended from and firmly engaged between the closure surface of the vessel head 12 and top of the reactor vessel 10. The upper core alignment plate 26 is orificed to permit coolant to enter the region of the control rod shroud tubes 28, but the upper guide structure support plate 30 is essentially integral so that the coolant flow continues on the flow path 32 through the outlet nozzle 16.

Each control rod, only one of which 29 is shown, must have a clear path for insertion and withdrawal over the entire vertical extent of the fuel assemblies 24. This is accomplished by providing control rod shroud tubes 28 connected with control rod guide tubes (not shown) in the fuel assemblies 24.

Figure 2:
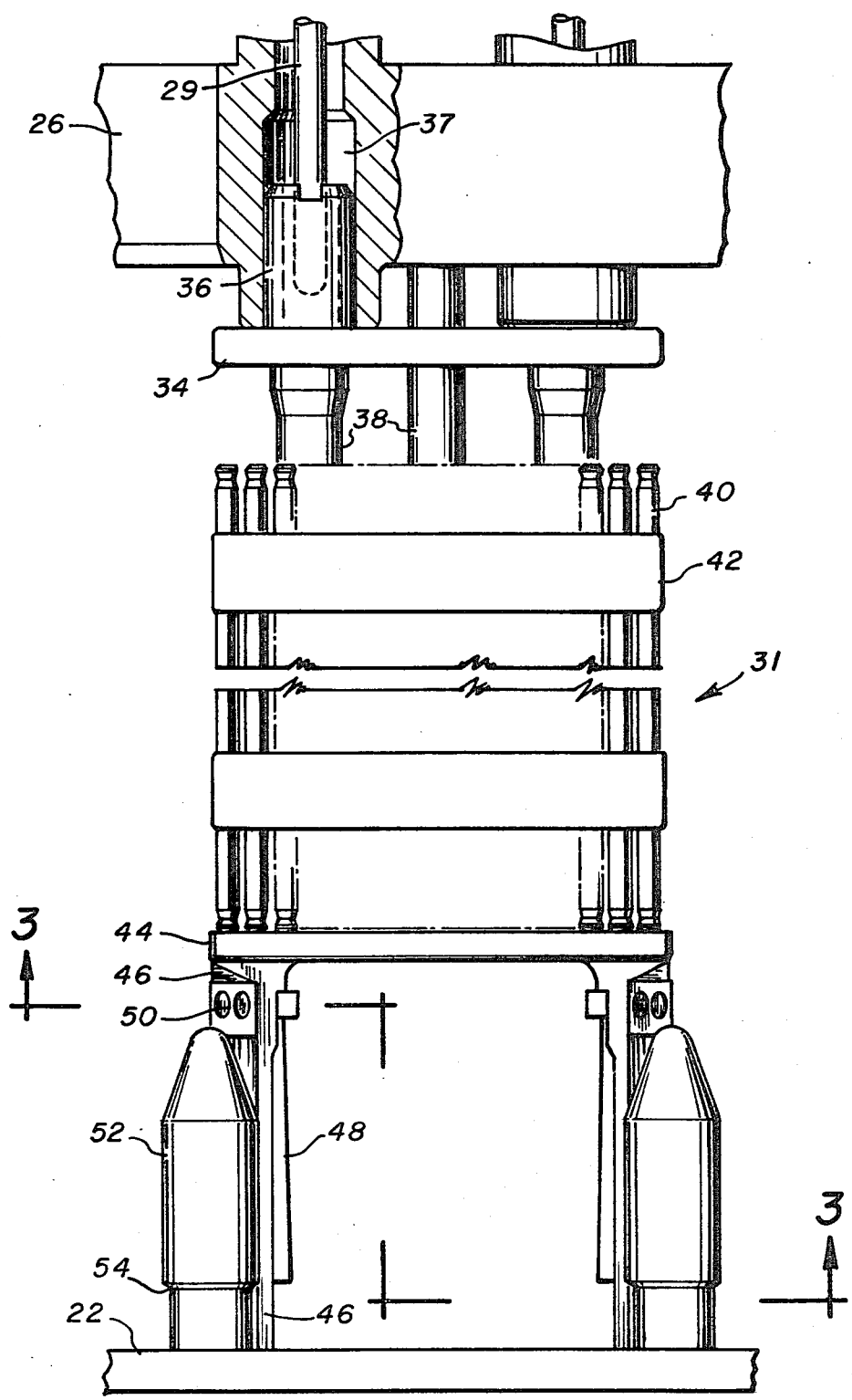
FIG. 2 is a fragmentary side view of a fuel assembly extending between upper and lower core support structure and showing one embodiment of the invention.
Figure 4:
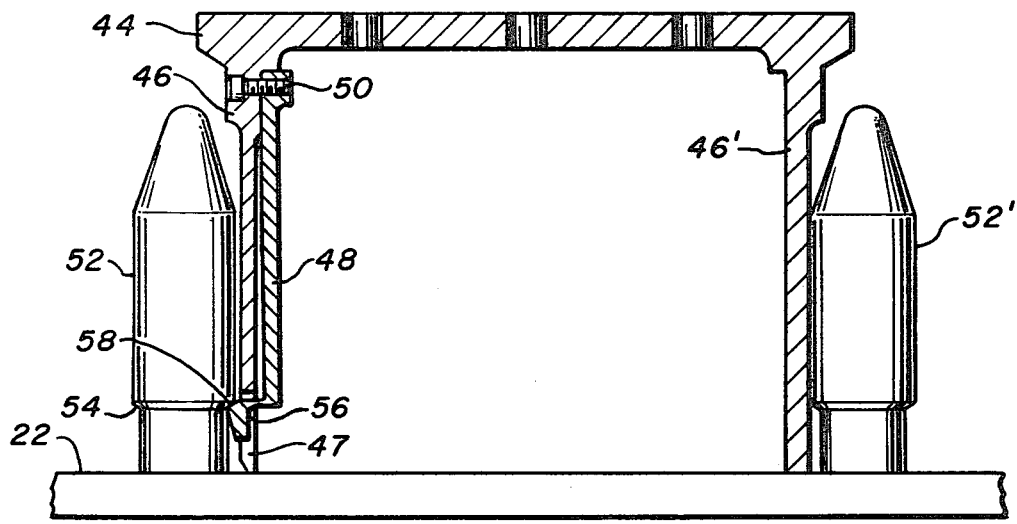
FIG. 4 is a side view of the lower end of the fuel assembly and structure embodying the invention along the line 4—4 of FIG. 3.

Referring now to FIGS. 2 and 4, a typical fuel assembly 31 includes five vertically extending zircaloy control rod guide tubes 38 to which are welded stainless steel upper and lower end fittings 34 and 44, respectively, and a plurality of axially disposed rectangular fuel spacer grids 42. These grids maintain the lateral spacing of the plurality of nuclear fuel rods 40 while permitting a limited amount of axial motion resulting from fuel rod expansion. Each fuel rod is welded at its bottom to the top of the fuel assembly lower end fitting 44. The bottom of each guide tube 38 is also welded to the top of the lower end fitting 44.

Four vertically extending and equally spaced fuel assembly alignment posts 46 are welded to the bottom of the fuel assembly lower end fitting 44 and support the entire weight of the fuel assembly against the core support plate 22. Fuel assembly alignment pins 52 extend upward from the core support plate 22 and are located in a uniform array on the core support plate such that each alignment pin 52 can be slidably received by the fuel assembly alignment post 46 on one corner of each of four fuel assemblies 31 properly located on the core support plate 22. When the fuel assembly alignment posts 46 are properly positioned on the core support plate 22, the latch 56 on the cantilever leaf spring 48 attached to the fuel assembly alignment post 46 with attachment means 50 engages a recessed region 54 in the fuel alignment pin 52.

When it is desired that the fuel assembly be removed from the core or relocated, the usual steps of unbolting and removing the reactor vessel head 12 and lifting the upper guide structure support plate 30 are followed. As described above, the control rod shroud tubes 28 are welded to the upper core alignment plate 26 and to the upper guide structure support plate 30 so that when the support plate 30 is lifted from the reactor the alignment plate 26 is also removed, exposing the upper end fittings 34 of all the fuel assemblies 24. To remove a fuel assembly from the core, the assembly is grasped at the upper end fitting 34 by the grappling tool on the refueling machine, which is customarily provided in all reactor installations. An upward force of about 3,000 pounds is required to overcome the hold-down force between the latch 56 and the recessed region 54 and to lift the fuel assembly out of the reactor. This force is well within the capabilities of a typical refueling machine.

A new or relocated fuel assembly can now be inserted in the location vacated by the removed assembly. The refueling machine lowers the new assembly into position between the four corner fuel alignment pins 52. The latch 56 of each cantilever spring 48 in its relaxed position will contact the upper portion of the fuel alignment pin 52. As the assembly continues to be lowered, each spring 48 will be deflectively loaded by the weight of the fuel assembly. As the fuel assembly alignment posts 46 contact the core support plate 22, each spring latch 56 snaps into engagement with the recessed region 54 on the fuel alignment pin 52. The grappling tool on the refueling machine is then released and withdrawn from the reactor. After all assemblies have been placed in their proper positions, the upper core alignment plate 26 is repositioned over the fuel assembly upper end fittings 34. Proper alignment of the fuel assembly is maintained by the sliding engagement of the upper fuel assembly alignment pins 36 into the recesses 37 in the upper core alignment plate. These recesses are large enough to accommodate the axial expansion of the control rod guide tubes 38 during core operation. The upper core alignment plate 26 is then firmly held in place when the vessel head 12 is tightened down.

In the preferred embodiment, only two non-diagonal fuel assembly alignment posts of the four in any given assembly are fitted with the cantilever spring 48. When the assembly is in place on the core support plate 22 and each latch 56 is engaged in the recessed region 54 associated with these two non-diagonal posts, the horizontal component of the loaded spring force is sufficient to produce a very tight contact between the other two non-diagonal alignment posts 46' and associated alignment pins 52'. The net outwardly directed horizontal forces against the four fuel alignment pins 52 and 52' associated with a given fuel assembly are sufficient to preclude significant lateral motion of the assembly during core operation.

Figure 3:
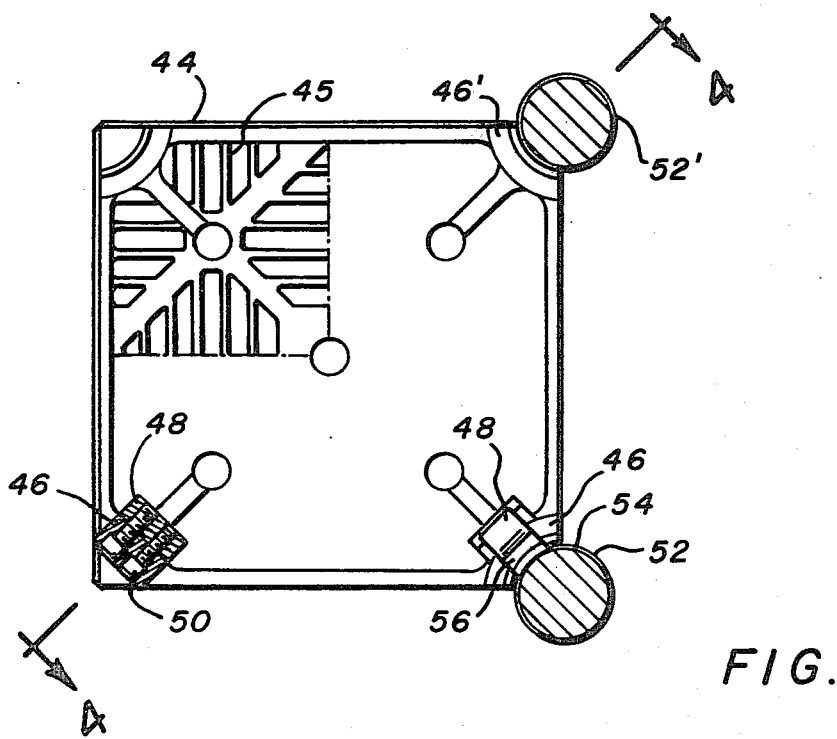
FIG. 3 is a cross section view along the line 3—3 of FIG. 2.

The relationship of the fuel assembly alignment posts 46 to the fuel alignment pins 52 is more fully illustrated in FIG. 3. The square fuel assembly lower end fitting 44 has a ribbed internal structure 45 to permit upward flow of coolant through the assembly and has the five control rod guide tubes 38 welded in a symetric pattern with the bottom end open to receive the coolant flow. A fuel assembly alignment post 46 is welded to the bottom of the lower end fitting 44 near each corner. The shape of the fuel assembly alignment post 46 is designed to slidably engage the fuel alignment pin 52, one of which is shared by four assemblies. Cantilever springs 48 are attached to two non-diagonal alignment posts 46 through bolt means 50. The other two non-diagonal alignment posts 46' are held firmly against alignment pins 52' by the horizontal force component of the cantilever springs as described above.

Referring now to FIG. 4, the fuel assembly alignment pin 52 has an upper cylindrical portion connected to a lower cylindrical portion of smaller diameter by a recessed region 54 having a downwardly inclined annular surface at an angle of approximately 30° with the horizontal. The alignment pin 52 is permanently and rigidly attached to the core support plate 22. The fuel assembly alignment post 46 is shown in the proper position whereby the fuel assembly will be held down during core operation. The alignment post 46 extends vertically in parallel with and in close proximity to the upper portion of the alignment pin 52. A cantilever leaf spring 48 is attached to the upper portion of the fuel assembly alignment post 46 by bolt means 50 and extends downward along the side of alignment post 46 that faces away from alignment pin 52. At an elevation above the core support plate 22 slightly above the elevation of the recessed region of the alignment pin 54, the alignment post 46 has a cut-out passageway 47 extending downward far enough to permit the cantilever leaf spring latch 56 to protrude above the side of the alignment post 46 that faces alignment pin 52. The latch 56 has an inclined surface 58 which makes an angle with the horizontal substantially the same as the angle of the recessed region 54.

In the locked position illustrated in FIG. 4, the cantilever spring 48 has a loaded deflection of about 0.089 inches, resulting in a horizontal force of about 450 pounds applied to the inclined surface 58. The vertical load on spring 48 required to disengage latch 56 is approximately 4,180 pounds. The maximum deflection of the cantilever spring 48 occurs during insertion and removal of the fuel assembly when the latch 56 is in contact with the upper portion of the fuel alignment pin 52, resulting in a total spring deflection of 0.189 inches. These dimensions are representative of a typical application wherein the fuel assembly lower end fitting is approximately 8.2 inches square and the length of the fuel assembly alignment post is approximately 5 inches.

The spring 48 can be designed to either lock and force the alignment posts 46 down against the core support plate 22, or a slight gap may be permitted to exist during core operation. In this case the fuel assembly 30 would lift until the latch 56 contacts the recessed region 54. Because the springs provide a vertical friction force there results a certain amount of hysterisis which prevents vertical chatter.

Figure 5:
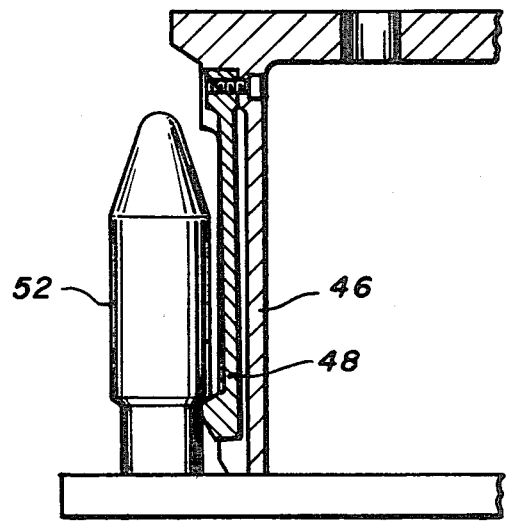
FIG. 5 is a side view of an alternate embodiment of the invention.
Figure 6:
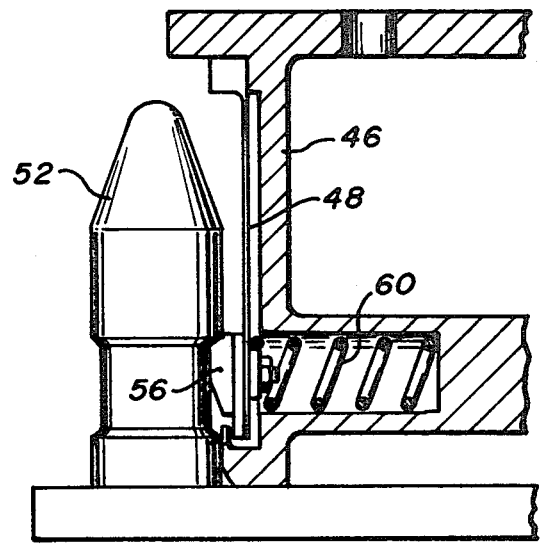
FIG. 6 is a side view of another embodiment of the invention.

Referring now to FIG. 5, an alternate embodiment of the invention is shown wherein the cantilever leaf spring 48 is attached to the side of the fuel assembly alignment post 46 that faces the alignment pin 52. As shown in FIG. 6, another embodiment of the invention includes a horizontally disposed coil spring 60 for augmenting the force of the cantilever spring 48 on latch 56.

It is contemplated that a person of ordinary skill in this art could adjust the length or material of cantilever spring 48 or the angles on the inclined surfaces 58 and 54 to achieve the desired combination of vertical holddown forces and horizontal stabilizing forces between the latch, pins, and posts. In the preferred embodiment each latch provides both vertical and horizontal force components. The desired horizontal force, however, should not be so large as to require more downward force for actuating the locking mechanism than is provided by the weight of the fuel assembly itself, since any additional force would result in an undesirable compression of the control rod guide tubes 38. Furthermore, the present invention is not limited to the use of cylindrical alignment pins 52 or any particular shape of fuel assembly alignment post 46. For example, the alignment posts 46 can be adapted to perimetrically surround the alignment pins 52. It is further contemplated that a person of ordinary skill in this art could practice the invention by attaching the spring to the alignment pin to mate with a recessed region on the alignment post.

What is claimed is:

1. In a nuclear reactor, structure for holding a fuel assembly in place on a core support plate, comprising:
    a. a horizontal core support plate;
    b. a plurality of fuel assembly alignment pins vertically and rigidly attached to said plate;
    c. said assembly, vertically disposed above said plate and having a substantially flat horizontal lower end fitting;
    d. a plurality of fuel assembly alignment posts extending vertically downward from said end fitting toward said plate, each of said posts being in close parallel proximity to one of said pins;
    e. spring means connected between each of a first set of at least one but less than all of said posts and a first set of said pins in respective close proximity therewith, for downwardly biasing said first set of posts relative to said first set of pins and for horizontally biasing each of said first set of posts away from each said respective pin in a direction and with a force sufficient to cause a second set of at least one of the remainder of said posts to firmly abut a second set of at least one of the remainder of said pins whereby a frictional resistance to vertical movement is achieved between said second set of posts and said second set of pins.

2. The structure of claim 1 wherein:
    a. said lower end fitting is square and has one of said posts extending from each corner thereof;
    b. said first set of posts consists of two non-diagonal posts; and
    c. the horizontal bias of said springs is in a direction along the diagonals of said end fitting.

3. The structure of claim 2 wherein said spring means comprises a cantilever spring.

4. The structure of claim 3 wherein:
    a. each of said fuel assembly alignment pins is substantially cylindrical and has a recessed region in the lower portion thereof; and,
    b. each of said cantilever springs has a latch formed at its lower end for engaging the recessed region in said pins, and each of said springs is attached at its upper end to the upper portion of one of said posts and is oriented downward such that the spring is deflectively loaded and said latch engages said recessed region when said four posts are in proper position relative to said plate.

5. The structure of claim 4 further comprising means for additionally biasing said latch towards said recessed region.

6. The structure of claim 4 wherein:
    a. said latch on each of said springs comprises an upward-facing inclined surface; and
    b. said recessed region on each of said pins comprises a downward-facing inclined surface.

7. The structure of claim 6 wherein said springs are attached to the sides of said first set of posts that face away from said pins that are in close proximity thereto when said four posts are in proper position relative to said plate.

8. The structure of claim 6 wherein said springs are attached to the sides of said first set of posts that face said pins that are in close proximity thereto when said four posts are in proper position relative to said plate.

9. The structure in claim 7 wherein each of said first set of posts has a cut-out passage through which said latch protrudes beyond the surface of said post that faces said pin.

* * * * *